United States Patent [19]

Lippens et al.

[11] Patent Number: 5,090,307

[45] Date of Patent: Feb. 25, 1992

[54] SHEAR BOLT COUPLING AND METHOD OF REPLACING A SHEAR BOLT

[75] Inventors: Christiaan A. C. Lippens, Sint-Laureins; Victor C. D. Demaecker, Zuienkerke, both of Belgium

[73] Assignee: Ford New Holland, Inc., New Holland, Pa.

[21] Appl. No.: 664,909

[22] Filed: Mar. 5, 1991

[30] Foreign Application Priority Data

Mar. 5, 1990 [EP] European Pat. Off. ........ 90200508.1

[51] Int. Cl.⁵ .................. B30B 13/00; B30B 1/00; A01F 15/08
[52] U.S. Cl. .................. 100/35; 29/402.08; 29/525.1; 56/341; 56/DIG. 2; 100/142; 100/189; 403/2
[58] Field of Search .................. 100/2, 3, 35, 142, 179, 100/189; 56/341, DIG. 2; 29/525.1, 402.08; 403/2, 11, 12

[56] References Cited

U.S. PATENT DOCUMENTS

| | | | |
|---|---|---|---|
| 682,514 | 9/1901 | Wilson | 100/142 |
| 1,009,719 | 11/1911 | Bradley | 100/142 |
| 1,028,404 | 6/1912 | Trabue | 100/142 X |
| 2,765,902 | 10/1956 | Myers | 100/189 X |
| 3,736,866 | 6/1973 | Herrick | 100/189 |
| 3,747,196 | 7/1973 | Whittington | 29/525.1 X |
| 4,569,282 | 2/1986 | Galant | 100/189 |
| 4,615,238 | 10/1986 | Cheatum | 100/179 X |
| 4,656,938 | 4/1987 | Webb et al. | 100/189 |
| 4,751,810 | 6/1988 | Naaktgeboren et al. | 100/189 X |
| 4,947,972 | 8/1990 | Lea | 403/2 X |
| 4,956,967 | 9/1990 | De Busscher et al. | 100/189 X |
| 4,962,632 | 10/1990 | Schoonheere et al. | 100/189 X |

*Primary Examiner*—Harvey C. Hornsby
*Assistant Examiner*—Stephen F. Gerrity
*Attorney, Agent, or Firm*—Frank A. Seemar; Larry W. Miller

[57] ABSTRACT

A shear bolt coupling incorporated in a drive transmission of an agricultural baler comprises a first rotatable member, a second rotatable member disposed coaxial with the first rotatable member, and a shear bolt operatively interconnecting the first and second rotatable members for transmitting power therebetween during normal operation. The shear bolt is arranged to shear off under excessive load conditions in order to interrupt power transmission between the rotatable members and thereby permit the rotatable members to move relative to each other. A shear bolt introducing lever is operatively associated with either the first or the second rotatable member for urging the shear bolt into a drive coupling position wherein the rotatable members are drivingly coupled together. The shear bolt introducing lever is movable relative to the rotatable members between an inoperative position clear of a shear bolt introducing area of the rotatable member having the shear bolt introducing lever associated therewith for enabling insertion of a new shear bolt, and an operative position for urging the new shear bolt into the drive coupling position.

11 Claims, 3 Drawing Sheets

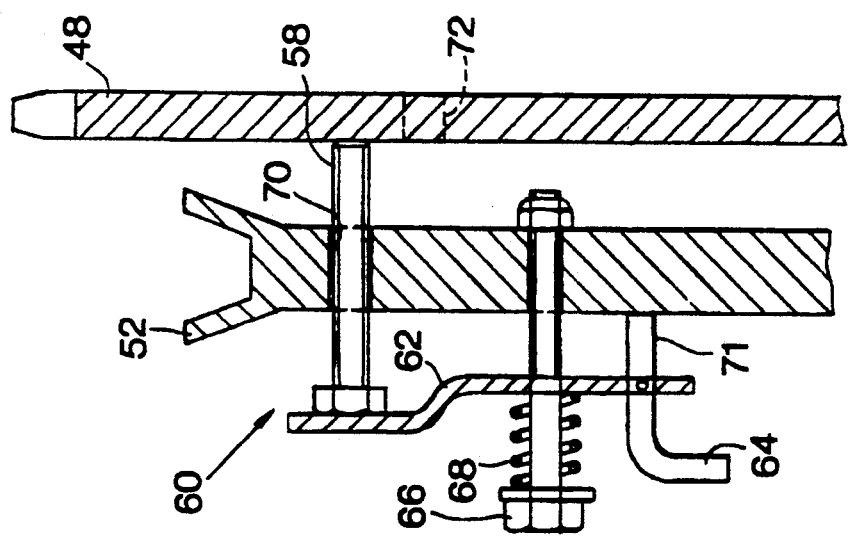
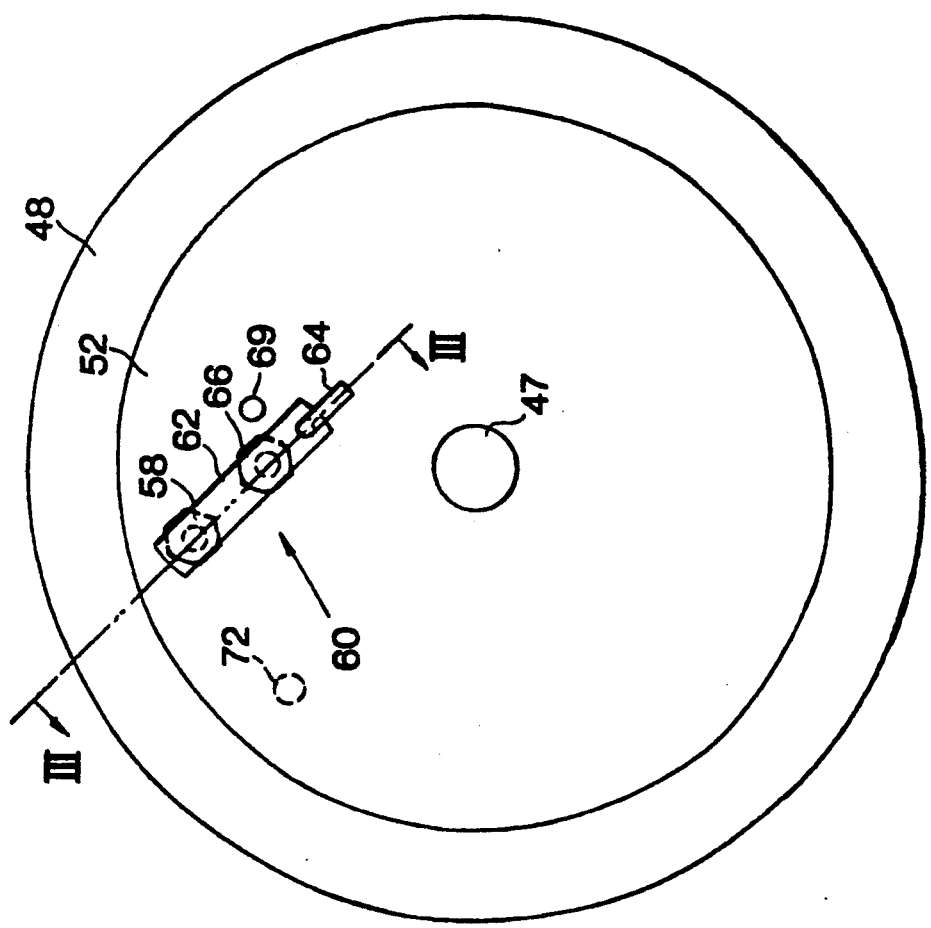

SHEAR BOLT COUPLING AND METHOD OF REPLACING A SHEAR BOLT

BACKGROUND OF THE INVENTION

This invention relates generally to a shear bolt coupling and a method of replacing a shear bolt and, in particular, to a shear bolt coupling and a method of replacing a shear bolt for use on an agricultural baler.

In a conventional type of agricultural baler, a feeder mechanism is operable to transport crop material collected by a pick-up device towards a plunger, which reciprocates in a bale case to form the crop material into rectangular bales. In operation, the feeder mechanism may be subjected to high overloads caused either by plugging of wads of crop material in the feeder duct or by jamming of a foreign object such as a piece of wood therein. In order to avoid structural damage to the baler upon the occurrence of a feeder obstruction, the feeder mechanism commonly is protected by a shear bolt coupling incorporated in the drive line thereof. The shear bolt coupling is composed of a first member and a second member which are interconnected by the shear bolt for, during normal operation, rotatably transmitting power therebetween. In case excessive loads are imposed on the feeder mechanism, high shear forces cause the shear bolt to fail whereby the first and second member are rotated relative to one another. As such, the drive line to the feeder mechanism is interrupted and severe damage is avoided.

Before normal operation of the baler can be resumed, the feeder mechanism has to be cleared and a new shear bolt has to be installed. However, since conventionally the movements of the feeder mechanism and the plunger are synchronized during normal operation, the first and second members must be reset correctly with respect to each other before a new shear bolt may be inserted to re-establish the drive transmitting coupling. For practical reasons, such as high resistance forces experienced in the drive line towards the feeder mechanism for example, the baler operator usually is unable to manually rotate the first or second members relative to each other in order to reset the same correctly. Most commonly, he resorts instead to manually actuating a flywheel which is incorporated between the tractor PTO and the baler main drive. As said flywheel usually is remote from the shear bolt coupling on the feeder mechanism, the operator has to wander back and forth between the former and the latter to see whether the first and second members are correctly positioned with respect to each other and to adjust the relative positions thereof if necessary. It readily will be appreciated that, if the operator could rely on the help of a second person, there would be no problem at all since in that case the operator could actuate the flywheel while said second person could insert the new shear bolt at the appropriate moment. Unfortunately, on most occasions, a second person is not immediately available, so consequently the operator nevertheless should rely on himself.

It is therefore an object of the present invention to provide an improved shear bolt coupling for agricultural balers and a method of easily replacing a broken shear bolt.

SUMMARY OF THE INVENTION

According to the present invention a method of replacing a shear bolt in a shear bolt coupling is provided. The shear bolt coupling is incorporated in a drive transmission and includes a first rotatable member, a second rotatable member disposed coaxial with the first rotatable member, and a shear bolt operatively interconnecting the first and second rotatable members for transmitting power therebetween during normal operation. The shear bolt is arranged to shear off under excessive load conditions in order to interrupt power transmission between the rotatable members and thereby permit the rotatable members to move relative to each other. Shear bolt introducing means is operatively associated with either the first or the second rotatable member for urging the shear bolt into a drive coupling position wherein the rotatable members are drivingly coupled together. The method comprises the steps of positioning a new shear bolt in the rotatable member having the shear bolt introducing means associated therewith after a used shear bolt has been sheared off, placing the shear bolt introducing means in an operative position for urging the new shear bolt toward the drive coupling position, and actuating the drive transmission at a location remote from the shear bolt coupling until the shear bolt introducing means urges the new shear bolt into the drive coupling position thereby drivingly coupling the rotatable members together.

In an agricultural baler including a plunger which is synchronized with a feeder mechanism during normal operation, the method preferably further comprises the step of removing the shear bolt introducing means from its operative position if the introduction of the new shear bolt results in improper timing between the plunger and the feeder mechanism.

According to another aspect of the present invention, a shear bolt coupling comprises a first rotatable member, a second rotatable member disposed coaxial with the first rotatable member, and a shear bolt for operatively interconnecting the first and second rotatable members and for transmitting power therebetween during normal operation. The shear bolt is arranged to shear off under excessive load conditions in order to interrupt power transmission between the rotatable members and thereby permit the rotatable members to move relative to each other. Shear bolt introducing means is operatively associated with either the first or the second rotatable member for urging the shear bolt into a drive coupling position wherein the rotatable members are drivingly coupled together. The shear bolt introducing means is movable, relative to the one rotatable member with which it is operatively associated, between an inoperative position clear of a shear bolt introducing area of the one rotatable member for enabling insertion of the shear bolt in the one rotatable member, and an operative position for urging the shear bolt toward the drive coupling position. Preferably, the shear bolt introducing means comprises a lever for engaging the shear bolt when the introducing means is in its operative position.

DESCRIPTION OF THE DRAWINGS

FIG. 2 is an enlarged view of a shear bolt coupling according to one embodiment of the present invention;

FIG. 3 is a sectional view taken on the line III—III of FIG. 2;

DESCRIPTION OF THE PREFERRED EMBODIMENT

Figure 1:
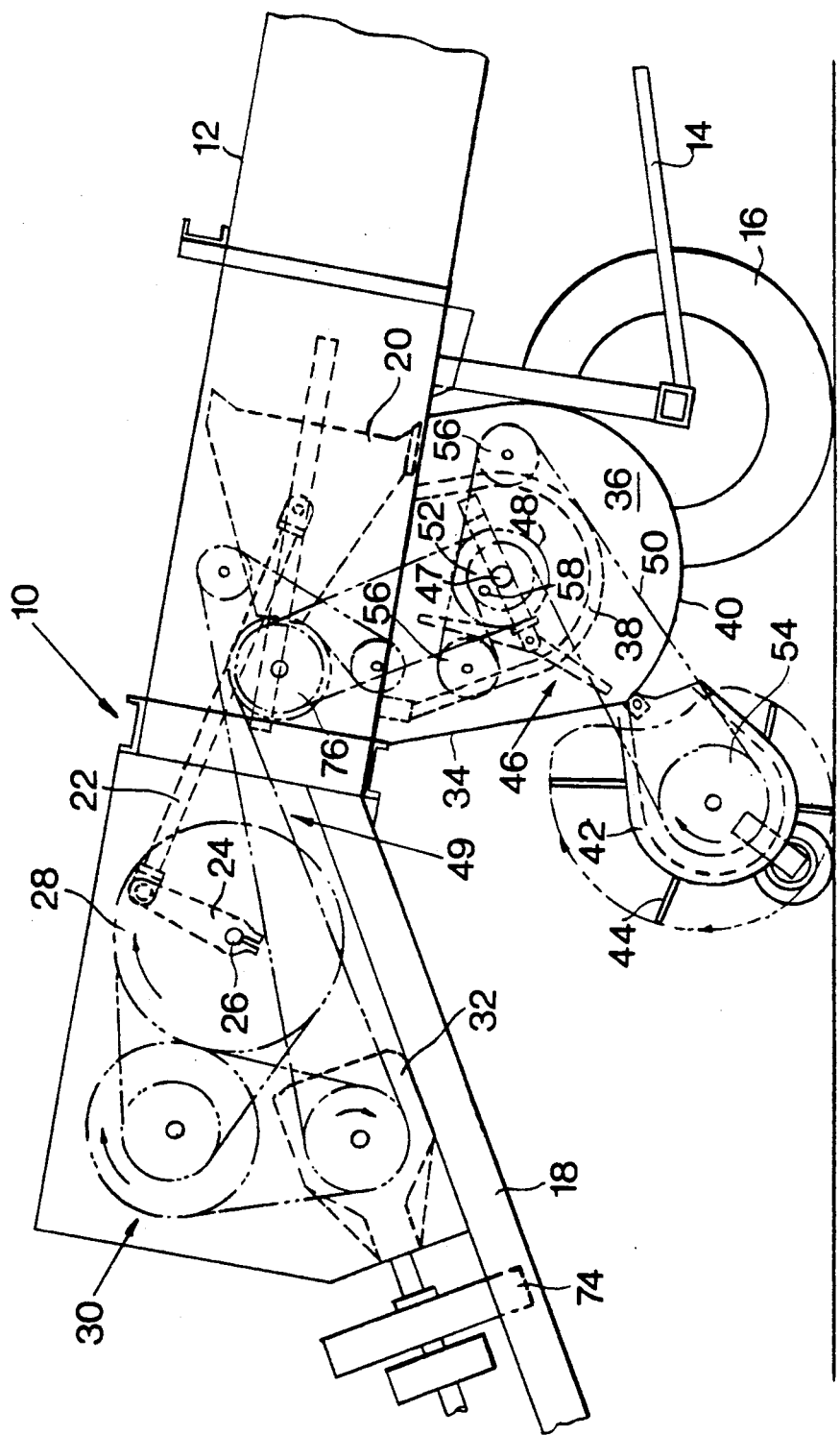
FIG. 1 is a schematic side elevation view of a baler incorporating a shear bolt coupling according to the present invention.

Referring to FIG. 1, a baler 10 includes a bale case 12 mounted on a frame 14 which is supported by wheels 16. A tongue 18 extends forwardly from the bale case 12 for attachment to a tractor (not shown). A plunger 20 is reciprocably disposed in the bale case 12 to form crop material into rectangular bales. The plunger 20 is attached by a connecting rod 22 to a crank arm 24 fixed to a shaft 26 on which a sprocket 28 is fixedly mounted. A drive transmission, generally indicated at 30, drivingly couples the sprocket 28 to a gearbox 32, which is adapted for connection to the PTO of a tractor (not shown). During operation of the baler 10, the sprocket 28 is rotated in a clockwise direction, as viewed in FIG. 1, in order to cause reciprocation of the plunger 20 in a fore-and-aft direction in the bale case 12.

A feed chamber 34 is mounted underneath the bale case 12 and includes a curved duct 36 having top and bottom walls 38 and 40, respectively, and sidewalls. The curved duct is open at its lower end and at its upper end and communicates at its upper end with an inlet opening formed in the bottom wall of the bale case 12. A pickup device 42 of a conventional type is pivotally connected to the feed chamber 34 and includes a plurality of fingers 44 which are rotatable in the direction indicated in FIG. 1 for lifting crop material from the ground and delivering it towards the feed chamber 34.

A feeder mechanism 46, provided on a transverse shaft 47, is operable to move crop material from the pickup device 42 through the feeder duct 36 and into the bale case 12 through the inlet opening in the bottom wall thereof. A sprocket 48, freely rotatably mounted on the shaft 47 of the feeder mechanism 46, receives motive power from a further drive transmission 49 extending from the gearbox 32. A belt 50 extends around a pulley 52 in a backwrap manner; the pulley 52 being fixedly mounted on the shaft 47. The sprocket 48 and the pulley 52 are interconnected by a shear bolt 58, the function of which will be explained furtheron. The belt 50 further extends around another pulley 54 on the pickup device 42 to rotate the latter in a clockwise direction. Idlers 56 are provided to properly tension the belt 50 and to allow vertical movement of the pickup device 42.

From what precedes, it readily will be appreciated that the pickup device 42 and the feeder mechanism 46 are both driven from the gearbox 32. The shear bolt arrangement between the sprocket 48 and the pulley 52 is provided, on the one hand, in the expectation of possible plugging of crop material occurring in the feeder duct 36, and, on the other hand, as a precaution against the possible presence of a large piece of wood, metal or stone, for example, in the crop material picked up by the pickup device 42, whereby such a foreign object is likely to become jammed in the feeder duct 36. In both events, the normal operation of the feeder mechanism 46 is impeded, whereby excessive forces are exerted on the shear bolt 58, causing the same to fail almost instantly. It will be noted that, upon failure of the shear bolt 58 the pulley 52 will loose its drive connection with the sprocket 48 causing the former to be halted whereas the latter starts idling on the shaft 47. As such, the drive to both the feeder mechanism 46 and the pickup device 42 is interrupted instantly as the shear bolt 58 fails. The drive train 49 on the contrary continues to be driven until the tractor operator disconnects the tractor PTO from the main power source. It is readily understood that, before the feeder mechanism 46 and the pickup device 42 can resume their normal operation, the broken shear bolt 58 has to be replaced by a new one. There are several manners by which such a replacement can be taken care off. In case remnants of the broken shear bolt 58 are still present in the bores 70 and 72 of the pulley 52, respectively the sprocket 48, which are shown in FIGS. 2 and 3, the operator first will remove said remnants for clearing these bores 70, 72. Since at the rupture of the shear bolt 58, the pulley 52 and the sprocket 48 move relative to one another, it is very unlikely that, after a shear bolt failure, the bores 70 and 72 will be aligned with respect to each other. This prevents the insertion of a new shear bolt 58 unless further action is taken.

Consequently, the operator may choose to completely clear the obstructed feeder duct by hand, which takes considerable time and effort but whereafter the feeder mechanism 46 and the pick-up mechanism 42 can be actuated by manual rotation of the pulley 52. As such, the bores 70 and 72 can become aligned, ready to receive a new shear bolt 58.

Following another option, the operator may try to manually rotate a sprocket 76 which is comprised in the drive transmission 49 towards the sprocket 48. Since the latter, at this instant, is freely rotatable on the shaft 47, nothing will prevent him from doing so from this side. However, the sprocket 76 is still drivingly coupled at the other side to the gear box 32, which, in turn, is drivingly connected to the plunger 20. Considering that crop material has accumulated in the bale case 12 in front of the plunger face 20, idling of the latter is prevented so that the operator will be forced to use special equipment, such as a lever, designed to engage the sprocket 76 in order to rotate the same. In so doing, the sprocket 48 equally rotates and the operator continues this movement until the bores 70 and 72 become aligned whereafter a new shear bolt 58 can be inserted.

However, it may happen that the bores 70 and 72 become aligned during the compression stroke of the plunger and, as compressed crop material has a natural tendency to expand, the operator, in this case, will have to keep said lever under tension with one hand while attempting to push a new shear bolt 58 in place with his other hand. No doubt, this is far from a convenient method to replace a broken shear bolt.

Following a still further option and on condition that there is a second person available besides the operator, the latter may choose to manually actuate the drive train 49 towards the feeder mechanism 46 by rotating the flywheel 74 (shown in FIG. 1) provided between the tractor PTO and the gear box 32. This is quite easy to accomplish as the transmission ratio between the flywheel 74 and the plunger 20 is in the order of 22:1, meaning that the flywheel 74 rotates twenty two times as fast as the plunger drive shaft 26. As a result, the torque which has to be exerted on the flywheel 74 for turning it around is roughly twenty two times smaller than the torque experienced on the drive shaft 26 which indeed enables the operator to manually actuate the flywheel 74 without the need of any special equipment, even if crop material has to be compressed by the bale plunger 20. As a comparison, the transmission ratio between the feeder mechanism 46 and the plunger drive shaft 26 is much smaller and may be 1:1 although in the preferred embodiment of the baler shown in FIG. 1 this transmission ratio is 2:1, i.e. for each complete plunger cycle, the feeder mechanism makes two 360' revolutions. This clearly explains why a special tool has to be used for rotating the sprocket 76 in the case described hereabove.

While the operator turns the flywheel 74 and consequently, by the intermediary of the drive train 49, also the sprocket 48 is rotated, the second person is able, without any difficulty, to insert a new shear bolt 58 upon the sprocket 48 reaching its correct position with respect to the pulley 52. Unfortunately, a second person is rarely available for helping to replace a broken shear bolt so that the operator nevertheless, in most cases, should rely on himself. In that case, he has to adjust the flywheel 74, go towards to shear bolt coupling and inspect whether the bores 70 and 72 are already aligned. If not, he is constrained to repeat the foregoing sequence over and over again until a new shear bolt 58 can be installed. There is a considerable risk however that, due to the expansion of compressed crop material, the flywheel 74 will tend to assume a position other than imposed by the operator. In order to overcome the foregoing, a brake (not shown) has to be installed on the flywheel 74 for keeping the same in a position as selected by the operator. This consequently means that, in addition to going back and forth between the flywheel 74 and the shear bolt coupling, the operator each time has to fasten and release the brake. It needs no further explanation that replacing a shear bolt by either one of the afore discussed methods is time consuming and/or impractical.

In order to obviate all mentioned drawbacks, the present invention aims to procure a mechanical "second person" for replacing a broken shear bolt and which operates in a manner as will be described hereinafter. Referring specifically to FIGS. 2 and 3, one embodiment of an improved shear bolt coupling according to the present invention is shown in more details therein. The surface of the pulley 52 facing away from the sprocket 48 is provided with shear bolt introducing means 60 comprising a shaped lever 62 to which a handle 64 is attached. A bolt 66 is attached to the pulley 52 for rotatably supporting the lever 62, which is urged towards the pulley 52 by spring means 68, shouldered against the head of the bolt 66. A cavity 69 in the pulley 52 is operable to receive the extending end of the handle 64 in a manner such that the lever 62 can be positioned in an inoperative position clear of the shear bolt 58. Upon failure of a shear bolt, the operator inserts a new shear bolt 58 into the bore 70 through the body of the pulley 52 whereafter he lifts the handle 64 out of the cavity 69 and rotates the lever 62 until the head of the bolt 58 is covered completely and engaged thereby as best can be observed in FIG. 3. In so doing, the shear bolt 58 is urged towards and against the sprocket 48 but is unable to penetrate the bore 72 therein unless the respective bores 70 and 72 become aligned. To this end, the operator manually turns the flywheel 74 whereby the sprocket 48 is rotated. Since, during this rotation, the shear bolt 10 58 is constantly urged against the sprocket 48, said bolt 58 slips into the sprocket bore 72 upon this bore 72 becoming aligned with the bore 70, thereby drivingly connecting the sprocket 48 to pulley 52.

Conclusively, although the drive transmission 49 is actuated from a position remote from the shear bolt coupling, the operator nevertheless is able to replace a broken shear bolt totally on his own in an efficient and expedient manner and without any difficulty. As such, a second person is no longer needed for replacing a shear bolt.

Subsequently, after having fastened the shear bolt 58, the operator will clear the feeder duct 36, certainly in case a foreign object has caused the plugging which led to the failure of the shear bolt 58. Yet, if a wad of crop material is responsible for the feeder duct 36 becoming obstructed, then the operator may decide to re-engage the tractor PTO without manually clearing said duct 36 beforehand, hoping that, by re-engaging the main baler drive, the obstruction will pass through the feeder duct 36 any how. Indeed, on condition that the re-engagement is performed in a slow and gradual manner thereby avoiding impact forces on the shear bolt 58, there is a fair chance that the feeder mechanism 46 will resume its normal operation without manual interference from the part of the operator and without the new shear bolt 58 failing again upon re-engagement of the baler drive.

Figure 5:
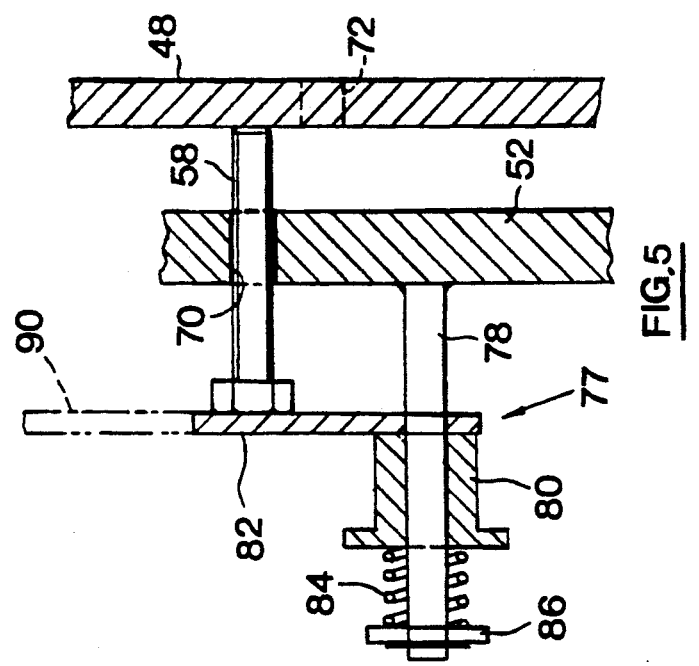
FIG. 5 is a sectional view taken on the line V—V of FIG. 4.

It will be understood that changes in the details, steps and arrangements of parts, which have been described and illustrated to explain the nature of the invention, will occur to and may be made by those skilled in the art without departing from the scope of the invention upon a reading of this disclosure. One such an alternative embodiment of the present invention is illustrated in FIGS. 4 and 5.

This embodiment tackles the problem of replacing a broken shear bolt in an almost identical manner as the embodiment of FIGS. 2 and 3, at least as far as the means 77 for inserting a new shear bolt 58 are concerned. Indeed, in this embodiment the pulley 52 is provided with a rod end 78, welded or otherwise secured thereto and which is parallel to the feeder drive shaft 47. A hub 80, comprising an extention 82, is slid over the rod 78 and is urged towards the pulley 52 by means of a spring 84 which abuts a washer 86 locked at the free end of the rod 78. So far, the arrangement 77, in essence, is identical to the shear bolt introducing means 60 of the first described embodiment. More precisely, in the alternative embodiment, the operator also has to introduce a new shear bolt 58 in the bore 70 whereafter the extention 82 is positioned over the head of the shear bolt 58 for urging the latter against the sprocket 48 in the expectation of the bores 70 and 72 becoming aligned.

However, it already has been indicated above that, in a preferred embodiment of the baler, the transmission ratio between the feeder 46 and the plunger 20 of the baler (shown in FIG. 1) is 2:1, which means that the feeder 46 is driven at twice the speed of the plunger 20. That is, the feeder shaft 47 makes two complete revolutions while the plunger 20 performs one complete reciprocating stroke. Since the feeder 46 operates differently during each of the two successive revolutions of the shaft 47, it is imperative for the feeder 46 to be correctly synchronized with the plunger movement. This timing is ensured by the correct positioning of the pulley 52 with respect to the sprocket 48; a position which is preserved for as long as the shear bolt 58 acts as a drive transmitting member in the shear bolt coupling. Upon failure of the shear bolt 58, one could align the bores 70, 72 and insert a new shear bolt, without however having regard for the proper timing between the feeder 46 and the plunger 20. Thus there is a 50% chance that the feeder cycle will mismatch the plunger movement and that the sprocket 48 should have been subjected to an additional 360' rotation before the insertion of a new shear bolt 58 in order to get the timing right.

Figure 4:
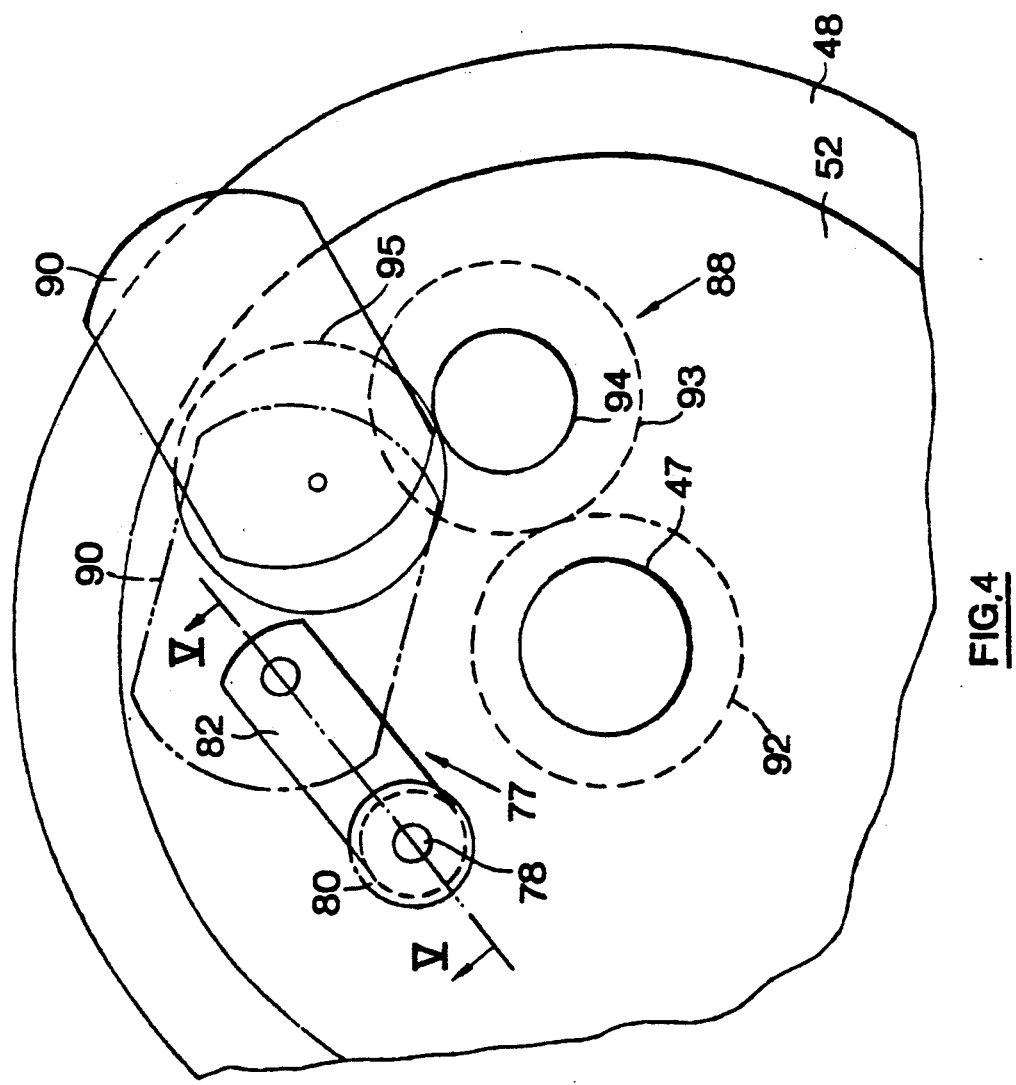
FIG. 4 is an enlarged view of another embodiment of the present invention.

The arrangement according to FIG. 4 eliminates the need for the operator to pay special attention to the timing referred to hereabove when replacing a broken shear bolt. A set of intermeshing gears, schematically indicated at 88, is operatively associated with the shear bolt coupling 48, 58, 52 in a manner such that, on the one hand, when the pulley 52 and the sprocket 48 do not move relative to one another, this set of gears 88 remains stationary with respect to the coupling 48, 58, 52 and, on the other hand, when a broken shear bolt 58 permits the sprocket 48 to rotate relative to the pulley 52, this set of gears 88 is set in motion. A shielding member 90 rotatably is mounted at an eccentric location on the pulley 52 and is operatively coupled to the set of gears 88 in a manner so that, for two complete revolutions of the sprocket 48 relative to the pulley 52, this shielding member 90 performs only one full revolution about its own rotatable mounting. This may be accomplished in a number of ways and, in one approach, the set of gears 88 therefore comprises four meshing gears 92-95. A first one 92 of these gears extends coaxially with the shaft 47 and is firmly coupled to the sprocket 48. All other three gears 93-95 are rotatably mounted on the pulley 52 at eccentric locations relative to the axis thereof. The second and third gears 93, 94 extend coaxially with respect to each other at a first eccentric location and are firmly coupled to each other for rotation in unison. The second gear 93 meshes with the first gear 92 and the third gear 94 meshes with the fourth gear 95 rotatably supported on the pulley 52 at a second eccentric location. The transmission ratio in this gear train is 2:1; this ratio being obtained in the arrangement shown in FIG. 4 by the fourth gear 95 having twice as many teeth as the third gear 94. Thus, when the sprocket 48 makes two revolutions with respect to the pulley 52, the fourth gear 95 is caused to make only one full revolution around its own axis. The aforementioned shielding member 90 is connected to the fourth gear 95 and the arrangement further also is such that, during these two full revolutions of the sprocket 48 relative to the pulley 52, this shielding member 90 covers the bore 70 once upon its alignment with the bore 72 and clears this bore 70 the next time that it is aligned with the bore 72. The arrangement further also is such that the timing between the pulley 52 and the sprocket 48 is right for the shear bolt 58 to be inserted when the bores 70 and 72 are aligned and the shielding member 90 is in its retracted position. This also means that, when the bores 70 and 72 are aligned but that the timing between the pulley 52 and the sprocket 48 isn't right for the shear bolt 58 to be inserted, the shielding member 90 covers the bore 70 thus making the insertion of the shear bolt 58 impossible (phantom lines in FIG. 4). If the foregoing arrangement is installed in combination with the shear bolt introducing means 80, 82, the operator is able to insert a new shear bolt 58 in the bore 70 and put the extention 82 against the head of said bolt 58 on condition that the bore 70 is not shielded off by the shielding member 90. As best can be noticed in FIG. 5, this shielding member 90 is dimensioned such that the extention 82 is swept away from above the bolt 58 when introduction of the latter would result in improper timing. In that case, the operator then, of course, has to reposition the extention 82 above the bolt 58 after the cover 90 has cleared the bore 70 so that the drive transmission between the pulley 52 and the sprocket 48 ultimately can be re-established. From the foregoing description, it readily will be understood that the present invention provides a simple and effective means for assisting the operator in replacing a shear bolt in a shear bolt coupling, especially when the drive transmission, into which said coupling is incorporated, has to be actuated from a location remote from said coupling. Although the present invention has been described particularly in relation to a shear bolt coupling in the drive transmission of an agricultural baler, it equally may be employed in any other drive transmission requiring the implementation of a shear bolt coupling.

What is claimed is:

1. A method of replacing a shear bolt in a shear bolt coupling incorporated in a drive transmission wherein said shear bolt coupling includes a first rotatable member, a second rotatable member disposed coaxial with the first rotatable member, said shear bolt operatively interconnecting the first and second rotatable members for transmitting power therebetween during normal operation, said shear bolt being arranged to shear off under excessive load conditions in order to interrupt power transmission between the rotatable members and thereby permit the rotatable members to move relative to each other, and shear bolt introducing means operatively associated with one of the first and second rotatable members for urging said shear bolt into a drive coupling position wherein the rotatable members are drivingly coupled together, said method comprising the steps of:

positioning a new shear bolt in said one rotatable member after a used shear bolt has been sheared off;

placing the shear bolt introducing means in an operative position for urging the new shear bolt toward said drive coupling position; and actuating the drive transmission at a location remote from the shear bolt coupling until the shear bolt introducing means urges the new shear bolt into said drive coupling position thereby drivingly coupling the rotatable members together and establishing power transmission between the rotatable members.

2. A method according to claim 1, further comprising the step of removing said used shear bolt from the shear bolt coupling prior to the step of positioning a new shear bolt.

3. A method according to claim 2, characterized in that the shear bolt coupling is operatively associated with a feeder mechanism of a baler.

4. A method according to claim 3, characterized in that the actuating step is performed by rotating a flywheel in the drive transmission.

5. A method according to claim 4, wherein the baler also has a plunger which is synchronized with the feeder mechanism during normal operation, and further comprising the step of displacing the shear bolt introducing means away from its operative position if the introduction of the new shear bolt results in improper timing between the plunger and the feeder mechanism.

6. A method according to claim 5, characterized in that the displacing step is effected by shielding means movably supported on said one rotatable member having the shear bolt introducing means associated therewith, and positioning means coupled to the shielding means and operatively associated with both the first and second rotatable members, the arrangement being such that, if establishing power transmission between the rotatable members results in improper timing between the plunger and the feeder mechanism, the shielding means is moved into a position interfering with the operative position of the shear bolt introducing means thereby displacing said shear bolt introducing means to an inoperative position.

7. A shear bolt coupling comprising:
a first rotatable member;
a second rotatable member disposed coaxial with the first rotatable member;
a shear bolt for operatively interconnecting the first and second rotatable members and for transmitting power therebetween during normal operation, said shear bolt being arranged to shear off under excessive load conditions in order to interrupt power transmission between the rotatable members and thereby permit the rotatable members to move relative to each other; and
shear bolt introducing means operatively associated with one of the first and second rotatable members for urging said shear bolt into a drive coupling position wherein the rotatable members are drivingly coupled together, the shear bolt introducing means being movable relative to said one rotatable member between an inoperative position clear of a shear bolt introducing area of said one rotatable member for enabling insertion of said shear bolt in said one rotatable member, and an operative position for urging said shear bolt toward said drive coupling position.

8. A shear bolt coupling according to claim 7, characterized in that the shear bolt introducing means comprises:

a lever for engaging said shear bolt when the shear bolt introducing means is disposed in the operative position; and
spring means operatively associated with said one rotatable member and said shear bolt introducing means for urging said lever into engagement with said shear bolt.

9. A shear bolt coupling according to claim 8, characterized in that the lever comprises a handle for facilitating movement of the shear bolt introducing means between said operative and inoperative positions.

10. A shear bolt coupling according to claim 9, in combination with a baler including a bale case, a plunger reciprocable within said bale case for compressing crop material therein into bales, a feeder mechanism operable to feed crop material into the bale case, drive means for driving the plunger and the feeder mechanism in synchronism, further comprising means for moving the shear bolt introducing means away from the operative position if the rotatable members are drivingly coupled together in a manner that results in improper timing between the plunger and the feeder mechanism.

11. A shear bolt coupling according to claim 10, characterized in that the means for moving the shear bolt introducing means away from the operative position comprises:
shielding means movably supported on said one rotatable member having the shear bolt introducing means associated therewith; and
positioning means coupled to the shielding means and operatively associated with both the first and second rotatable members, the arrangement being such that, if establishing power transmission between the rotatable members results in improper timing between the plunger and the feeder mechanism, the shielding means is moved into a position interfering with the operative position of the shear bolt introducing means thereby displacing said shear bolt introducing means to the inoperative position.

* * * * *